US009850650B2

(12) United States Patent
Alexander (10) Patent No.: US 9,850,650 B2
(45) Date of Patent: Dec. 26, 2017

(54) STORM DRAIN TRAP INSTALLATION DEVICE

(71) Applicant: James Russell Alexander, Surrey (CA)

(72) Inventor: James Russell Alexander, Surrey (CA)

( * ) Notice: Subject to any disclaimer, the term of this patent is extended or adjusted under 35 U.S.C. 154(b) by 0 days.

(21) Appl. No.: 15/230,260

(22) Filed: Aug. 5, 2016

(65) Prior Publication Data

US 2016/0340888 A1 Nov. 24, 2016

Related U.S. Application Data

(63) Continuation-in-part of application No. 14/170,223, filed on Jan. 31, 2014, now abandoned.

(51) Int. Cl.
| | |
|---|---|
| *E03F 3/06* | (2006.01) |
| *B25J 1/04* | (2006.01) |
| *E03F 5/10* | (2006.01) |
| *E03F 1/00* | (2006.01) |
| *A43D 111/00* | (2006.01) |
| *E03F 3/00* | (2006.01) |
| *E03F 5/02* | (2006.01) |
| *E03F 5/04* | (2006.01) |
| *E03F 7/00* | (2006.01) |

(52) U.S. Cl.
CPC ............... *E03F 5/105* (2013.01); *B25J 1/04* (2013.01); *Y10T 29/49822* (2015.01); *Y10T 29/49876* (2015.01); *Y10T 29/53896* (2015.01)

(58) Field of Classification Search
CPC ..... B23P 19/04; B25J 1/04; B25J 1/02; B25B 3/00; B25B 9/00; B25B 27/146; B25B 7/02; Y10T 29/53961; Y10T 29/53978; Y10T 29/53991; Y10T 29/49822; Y10T 29/49876; E03F 1/00; E03F 5/105; B21D 1/12; A47F 13/06
See application file for complete search history.

(56) References Cited

U.S. PATENT DOCUMENTS

| | | | |
|---|---|---|---|
| 2,196,116 A | 4/1940 | Johnson | |
| 2,256,045 A | 9/1941 | Dargitz | |
| 2,703,251 A | 3/1955 | Green | |
| 5,004,534 A * | 4/1991 | Buzzelli | B01D 21/003 |
| | | | 210/164 |
| 6,719,489 B1 * | 4/2004 | Colson | E03F 1/00 |
| | | | 137/312 |
| 8,512,556 B2 | 8/2013 | Duran et al. | |
| 2007/0035144 A1 * | 2/2007 | Buzby | B25B 7/12 |
| | | | 294/137 |
| 2008/0035570 A1 | 2/2008 | Lugo | |
| 2011/0315617 A1 | 12/2011 | Lyme et al. | |

FOREIGN PATENT DOCUMENTS

CA 1261559 9/1989

\* cited by examiner

*Primary Examiner* — Ryan J Walters
*Assistant Examiner* — Lawrence Averick
(74) *Attorney, Agent, or Firm* — Richard D. Okimaw (57) ABSTRACT

A device for installation, maintenance, and/or removal of a catch basin hood and/or a catch basin trap; the device comprising a shank connecting a handle on one end and jaw-like arms on an opposite end, wherein the handle end of the shank further comprises a lever capable of actuating a snap-action installation of a catch basin trap.

16 Claims, 9 Drawing Sheets

STORM DRAIN TRAP INSTALLATION DEVICE

CROSS REFERENCE TO RELATED APPLICATION

This application is a continuation-in-part of applicant's co-pending application Ser. No. 14/170,223, filed Jan. 31, 2014, the entire contents of which is hereby expressly incorporated by reference herein.

FIELD OF THE DISCLOSURE

The present disclosure relates to the field of devices and methods for installing and/or maintaining and/or uninstalling traps, filters, inserts, bags, and the like for catch basins in storm water drains.

BACKGROUND OF THE DISCLOSURE

It is well known that storm water run-off is one of the major sources of water pollution. Therefore, it is a common, and often well regulated, practice in many municipalities to use and/or retrofit a catch basin of a storm drain with a trap, pipe, filter, insert, or bag for the collection of debris, so that debris is precluded from washing out to and contaminating the sea or some other body of water. Such traps need to be installed, maintained, and/or uninstalled by maintenance workers or other individuals on a routine basis. When doing such maintenance work, a worker needs to place himself/herself in an unsafe position (e.g., a prone position on a street), rely on multiple tools such as high-powered hammer drills, screwdrivers and wrenches, and invest excessive amounts of time to complete the work properly.

Catch basins, hooded catch basins and/or traps designed for the same are readily available and may be found, for example, in U.S. Pat. Nos. 2,196,116; 2,256,045; 2,703,251; 8,512,556; and 5,004,534; U.S. Publication Nos. 20080035570; 20110315617; and 20130008851; and CA Publication Nos. 1261559; however, none of these references disclose the embodiments of the present disclosure.

Therefore, a need exists in the art for a device and/or kit and/or method for safer, more efficient installation, maintenance, and/or removal of traps for catch basins in storm drains.

SUMMARY OF THE DISCLOSURE

Disclosed herein is a device for installation, maintenance, and/or removal of a catch basin hood and/or a catch basin trap; the device comprising a shank connecting a handle on one end and jaw-like arms on an opposite end, wherein the handle end of the shank further comprises a lever capable of actuating a snap-action installation of a catch basin trap.

In another aspect, disclosed herein is a method for installing, maintaining, and/or removing a catch basin hood and/or a catch basin trap; the method comprising: a) providing a device comprising a shank connecting a handle on one end and jaw-like arms on an opposite end, wherein the handle end of the shank further comprises a lever capable of actuating the jaw-like arms for snap-action installation of a catch basin trap; b) engaging the jaw-like arms with a top edge and bottom edge of a front face of the catch basin trap; c) inserting the catch basin trap into a catch basin; and d) activating the lever of the device to activate release of the pin for snap-action installation of the catch basin trap.

In yet another aspect, disclosed herein is a kit for installing, maintaining, and/or removing a catch basin hood and/or a catch basin trap; the kit comprising: a) a device comprising a shank connecting a handle on one end and jaw-like arms on an opposite end, wherein the handle end of the shank further comprises a lever capable of actuating a snap-action installation of a catch basin trap; and b) a catch basin trap.

DETAILED DESCRIPTION OF THE EMBODIMENTS

The following is a detailed description of certain specific embodiments of a device for the installation, maintenance, and/or removal of a catch basin hood and/or a catch basin trap, methods of use and kits as disclosed herein.

In one aspect, disclosed herein is a device for installation, maintenance, and/or removal of a catch basin hood and/or a catch basin trap; the device comprising a shank connecting a handle on one end and jaw-like arms on an opposite end, wherein the handle end of the shank further comprises a lever capable of actuating a snap-action installation of a catch basin trap, wherein the lever is connected to a pin via a cable, and wherein the lever is capable of activating release of the pin for the snap-action installation of a catch basin trap by pulling the pin triggering the catch basin trap to expand and/or lock into the catch basin.

Catch basins are known in the art as functioning to collect storm water, or waste water, and re-directing the surface water excess from causing flooding. Catch basins typically, in combination with a network of pipes and additional catch basins, flow to an outlet point such as an ocean, lake, stream, river or sparsely populated areas. However, catch basins are also often the entry point of pollutants and/or debris from sources found in surface water excess and/or storm water run-off. Such pollutants and/or debris include, without limitation, hydrocarbons (i.e., oil), bacteria, sediment, trash, plastics, metals, sand, silt, organic material such as leaves, and grass clippings, particulates, soil, pharmaceutical waste, detergents, coolants, grease, fertilizer, pesticides, paint, and feces. As a result, polluted storm water may be discharged, untreated, directly into bodies of water such as oceans, bays, rivers, lakes, and streams.

Figure 1:
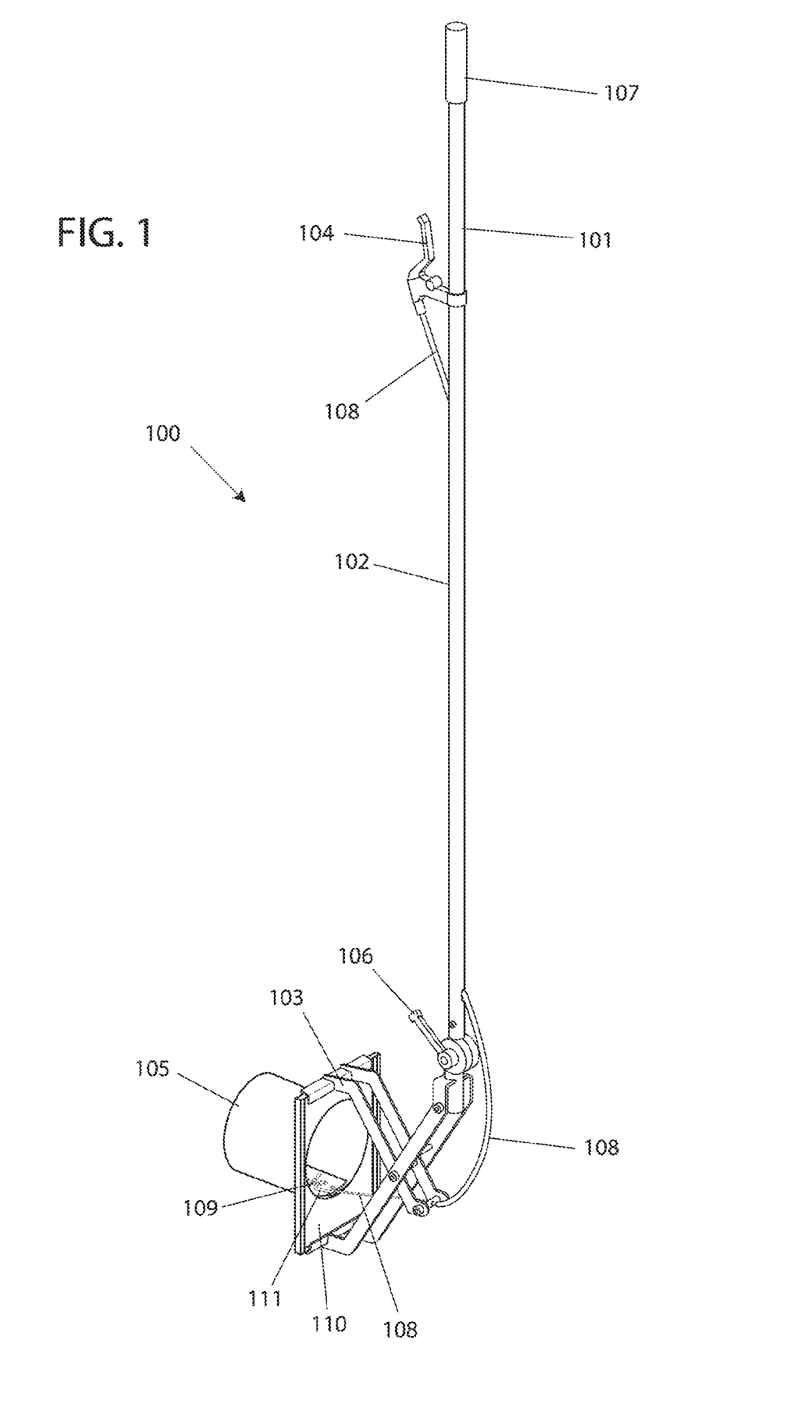
FIG. 1 illustrates a perspective view of an embodiment of the device 100 with the jaw-like arms 103 of the device clasping a catch basin trap 105.

Catch basin traps are well known as often being employed for alleviating pollutants and/or debris from contaminating the water source at the outlet point. Turning to the drawings, FIG. 1 depicts the device 100 for installation, maintenance, and/or removal of a catch basin trap comprising a shank 102, a handle 107, a lever 104, a cable 108, a handle end 101, a tightening handle 106 and actuating jaws 103. In some embodiments, the shank is hollow. In one embodiment, the actuating jaws 103 of the device disclosed herein are positioned over the front face 110 (square or rectangular shaped) of a catch basin trap 105 to be installed in a catch basin. Moreover, the hand lever 104 located on the handle end 101 of the of the shank 102 of the device functions by pulling a pin 109 situated in the catch basin trap 105 triggering the catch basin trap 105 to expand and/or lock into via snap-action of the catch basin trap 105 within a catch basin of a storm drain and/or a preexisting pipe/trap of the catch basin. In some embodiments, the catch basin of a storm drain and/or a preexisting pipe/trap of the catch basin have a diameter between about 4 inches and 12 inches.

An installer uses an adjoined clasp or pin catch 111 on the cable 108 of the device to latch onto and/or make a connection to the pin 109 on the catch basin trap 105. The pin 109 comprises a hook at a first end oriented towards the front face 110 of the catch basin trap 105, thereby allowing the pin 109 to be pulled towards the jaws 103. In one embodiment the clasp is adjoined to the device via a cable 108. During operation of the device, the installer presses the lever 104 down with minimal force to apply tension to the cable 108 which pulls the adjoined clasp or pin catch 111 engaged with the pin 109 thereby releasing the pin from its connection to the catch basin trap 105. In this aspect, the installer presses and/or squeezes the hand lever 104 this causes the adjoined clasp or pin catch 111 to release and/or pull out the pin 109 so that the trap 105 springs open and/or snaps into place via a snap-action and/or is held into place in the catch basin of a storm drain. In certain embodiments, the handle end 101 of the shank 102 of the device disclosed herein comprises a hand grip 107. In some embodiments, the shank is hollow.

Figure 2:
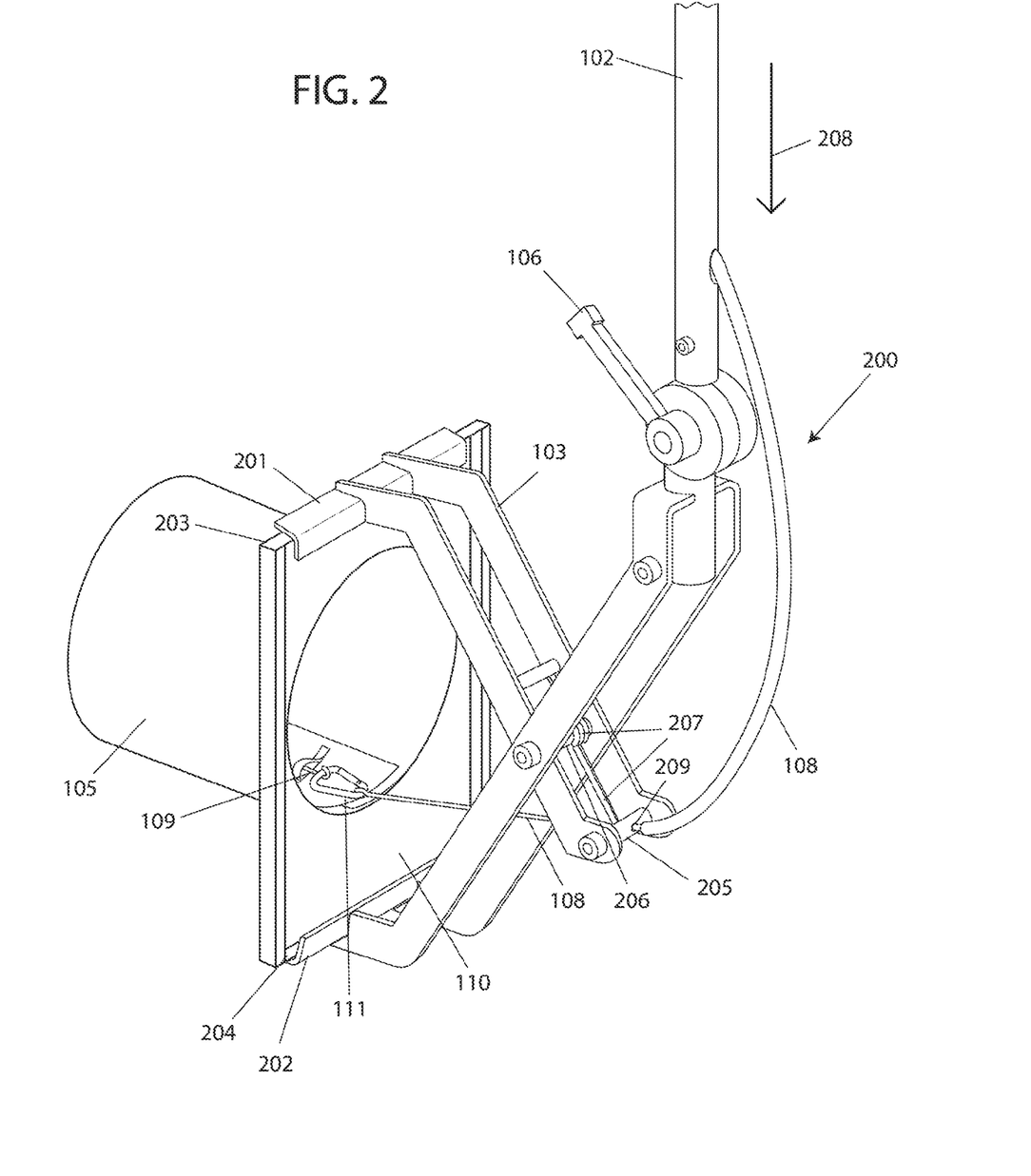
FIG. 2 illustrates an alternative perspective view of an embodiment of the device 200 with the jaw-like arms 103 of the device clasping a catch basin trap 105.

FIG. 2 depicts an alternative view of the device 200 with the jaw-like arms 103 of the device clasping a catch basin trap 105. As illustrated the face 110 of the catch basin trap 105 is engaged towards the jaws with a lower jaw slot 202 and an upper jaw slot 201 capable of engaging with a top catch basin edge 203 and a bottom catch basin edge 204, respectively. The jaws are actuated and the lower jaw slot 202 and the upper jaw slot 201 are capable of squeezing together to engage the catch basin trap via a spring 207 affixed to the axle portion 206 and rod 205 in a manner that causes the jaws 103 to contract around the edges of the catch basin trap 105. During installation of catch basin trap 105 or the catch basin hood 608 the jaws 103 are disengaged from the catch basin trap 105 or the catch basin hood 608 by the operator applying vertically downward pressure 208 to the handle 107, which releases tension of the spring 207 on the jaws 103, thereby retracting the lower jaw slot 202 and the upper jaw slot 201. As depicted, the cable 108 is affixed to the rod 205 via a fastener or rod aperture 209, whereby the cable 108 is routed through the jaws 103 and is capable of engaging with the adjoined clasp and/or pin catch 111, which is capable of releasing the pin 109 when the lever is actuated.

Figure 3:
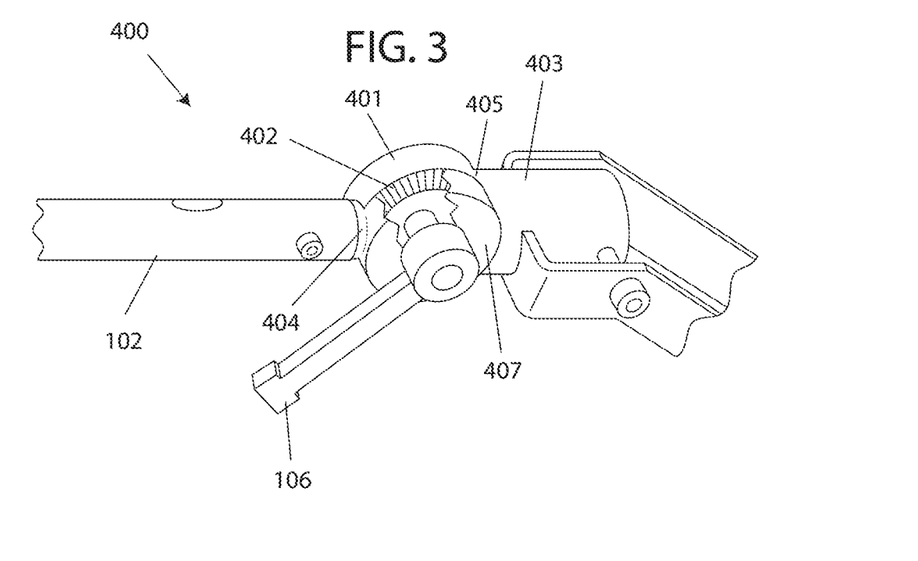
FIG. 3 illustrates an alternative perspective view of an embodiment of the device 400 disclosed herein comprising a tightening handle 106 at the bottom portion of the shank so that the tightening handle 106 is capable of controlling the swivel function of the actuating jaws 103 and so that the jaw-like arms may be positioned and locked at a desired angle for installation of the catch basin trap 105.

In certain embodiments, the installer adjusts the swivel or rotation of the device disclosed herein at the bottom portion of the shank 102 so that the jaws 103 are positioned at a sufficient angle for installation of the trap 105 into the catch basin. This function can be achieved manually, such as by manual adjustment of the actuating jaws 103 of the device so the jaws 103 are locked into position at the desired angle. FIG. 3 illustrates a view of an embodiment of the device disclosed herein comprising a tightening handle 106 at the bottom portion of the shank so that the tightening handle 106 is capable of controlling the swivel function of the actuating jaws 103 and so that the jaw-like arms may be positioned and locked in a desired angle for installation of the catch basin trap 105. In some embodiments, the actuating jaws 103 may be adjusted via a tightening handle 106, which controls the swivel function of the actuating jaws 103 so that they may be positioned and locked in the desired angle for installation of the catch basin trap 105. In a further embodiment, the tightening handle 106 is located at the bottom portion of the shank 102. In another embodiment of the device disclosed herein, a knuckle or pivot is located at the mid portion of the shank 102 to provide for an additional and/or alternative means for adjustment of the angle of the actuating jaws 103 for installation of a catch basin trap 105. In some embodiments, the jaw-like arms are capable of swiveling at an angle sufficient for installing the trap in or removing the trap from a corresponding catch basin. In some embodiments, the swivel of the jaw-like arms rotates the arms up to a 228° angle 301. The shank 102 is engaged 404 with a first swivel 407 capable of engaging with a second swivel 401, whereby each swivel comprise a plurality of teeth 402 that secure the swivel function at a desired angle via the tightening handle 106 relative to jaws shank 403 which is engaged 405 with the second swivel 401.

Figure 4:
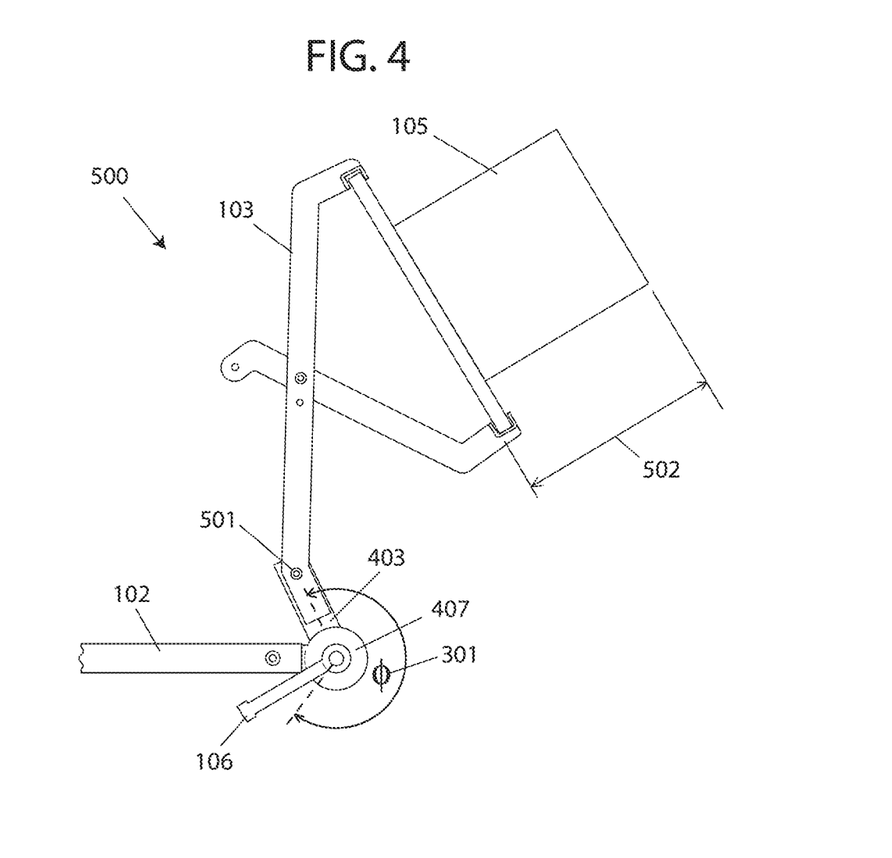
FIG. 4 illustrates an alternative perspective view of an embodiment of the device 500 swiveling, at a particular angle 301, whereby the jaw-like arms 103 of the device are clasping a catch basin trap 105 and depicting the connection point 501 of the shank portion 403 and the jaw-like arms 103 of the device.

In this aspect, FIG. 4 depicts a view of an embodiment of the device 500 swiveling, at a particular angle 301, whereby the jaw-like arms 103 of the device are clasping a catch basin trap 105 and depicting the connection mount 501 of the shank portion 403 and the jaw-like arms 103 of the device. In some embodiments, the jaws shank 403 is affixed to the jaws 103 via one or more nut and/or bolts 501. In some embodiments, the catch basin trap 105 has a depth 502 of between about 6 inches and 24 inches. In some embodiments, the catch basin trap 105 has a depth 502 of about 9 inches.

Figure 5:
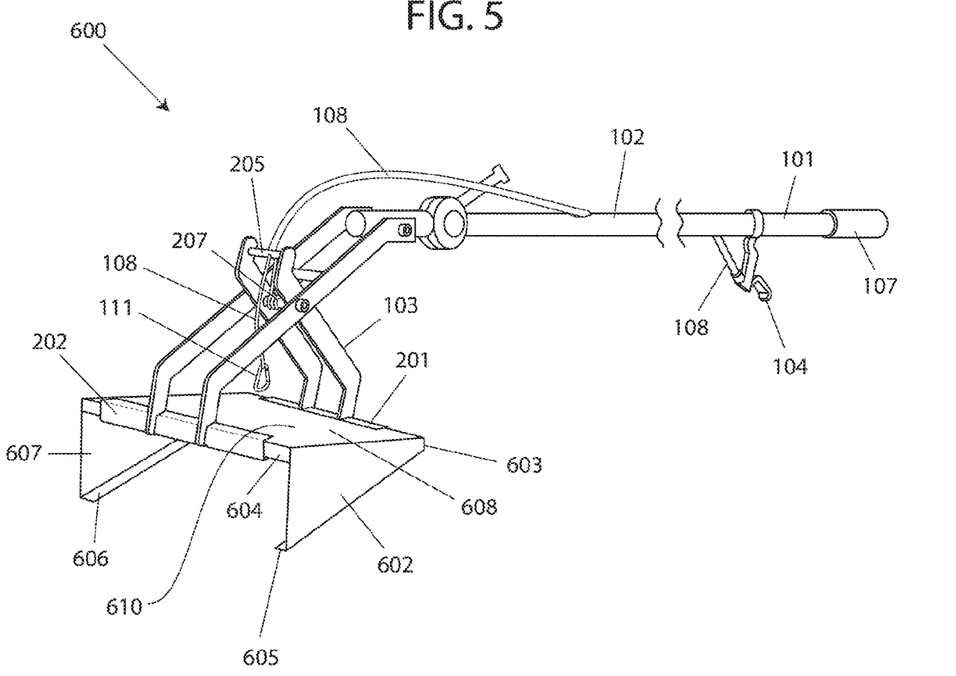
FIG. 5 illustrates a perspective view of an embodiment of the device 600 disclosed herein, positioned in a particular angle of rotation, and gripping a catch basin hood 608 of a catch basin trap 105. As illustrated, the device positioned in a particular angle of rotation, and gripping a hood of a catch basin trap. The device is positioned in a particular angle of rotation, and gripping a hood of a catch basin trap whereby the device is used to drop and/or slide the hood over an installed trap.

Turning to the drawings, FIG. 5 depicts a view of an embodiment of the device 600 disclosed herein, positioned in a particular angle of rotation, and gripping a catch basin hood 608 of a catch basin trap 105. As illustrated, the device positioned in a particular angle of rotation, and gripping a hood of a catch basin trap. The device is positioned in a particular angle of rotation, and gripping a hood 608 of a catch basin trap whereby the device is used to drop and/or slide the hood over an installed catch basin trap 105. The catch basin hood 608 is capable of engaging with the jaws 103 via the lower jaw slot 202 and the upper jaw slot 201 and the lower hood edge 604 and the upper hood edge 603, respectively. In another embodiment, the installer will position the jaws 103 of the device disclosed herein over a corresponding hood of the trap 105 and the device is then used to drop and/or slide the hood over an installed catch basin trap 105 via the concave edge formed with a inner left hood edge 606 and an inner right hood edge 605 formed along the left hood side 607 and a right hood side 602. The catch basin hood 608 is installed with a front hood side 610 facing towards the jaws with the upper hood edge 603 positioned over the top catch basin edge 203.

Figure 6:
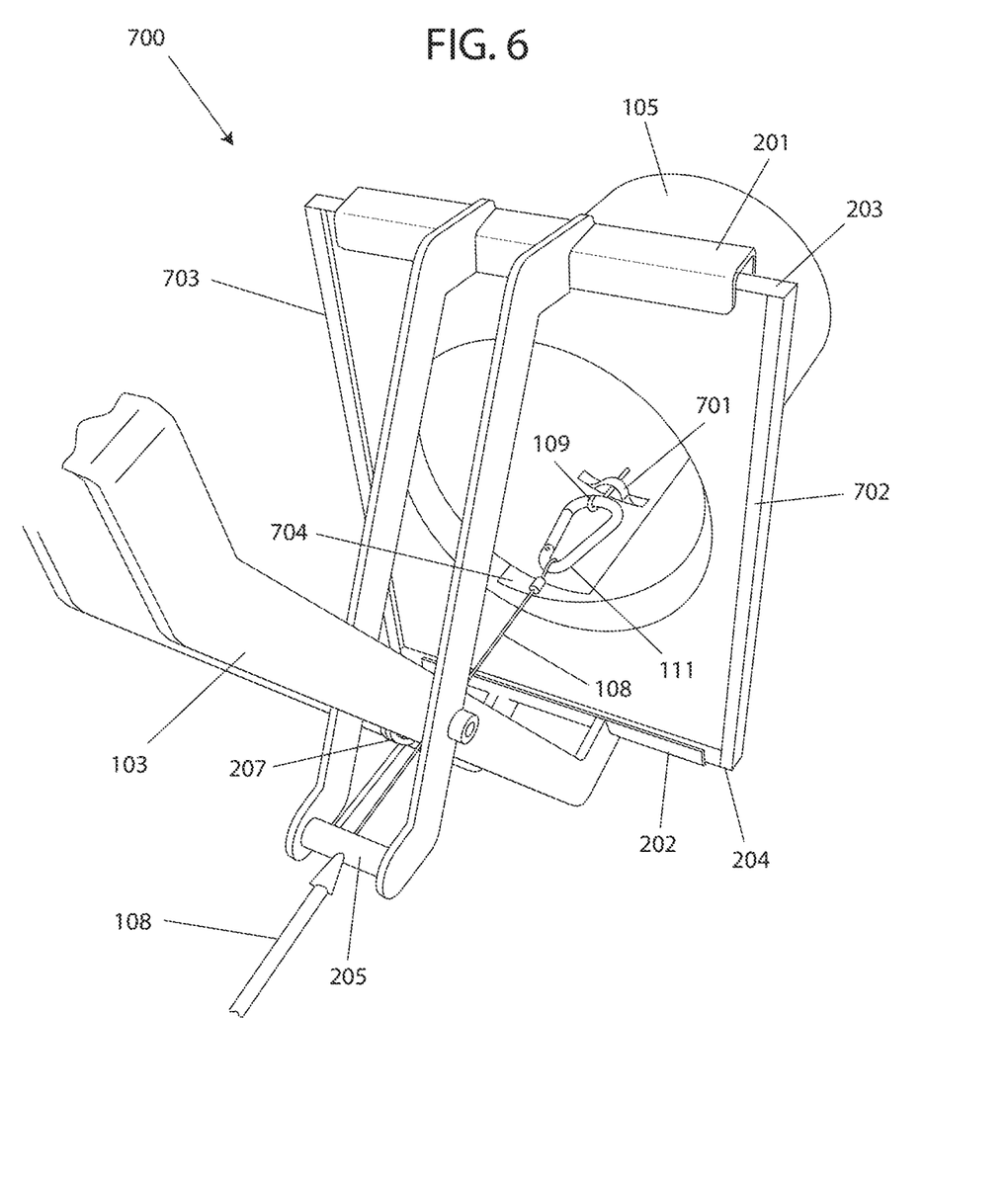
FIG. 6 illustrates a perspective view of an embodiment of the device 700 disclosed herein, whereby the jaw-like arms 103 of the device are clasping a catch basin trap 105 with a clasp 111 is engaged with a pin 109 that is engaged with a saddle portion 701 of the catch basin trap 105.
Figure 7:
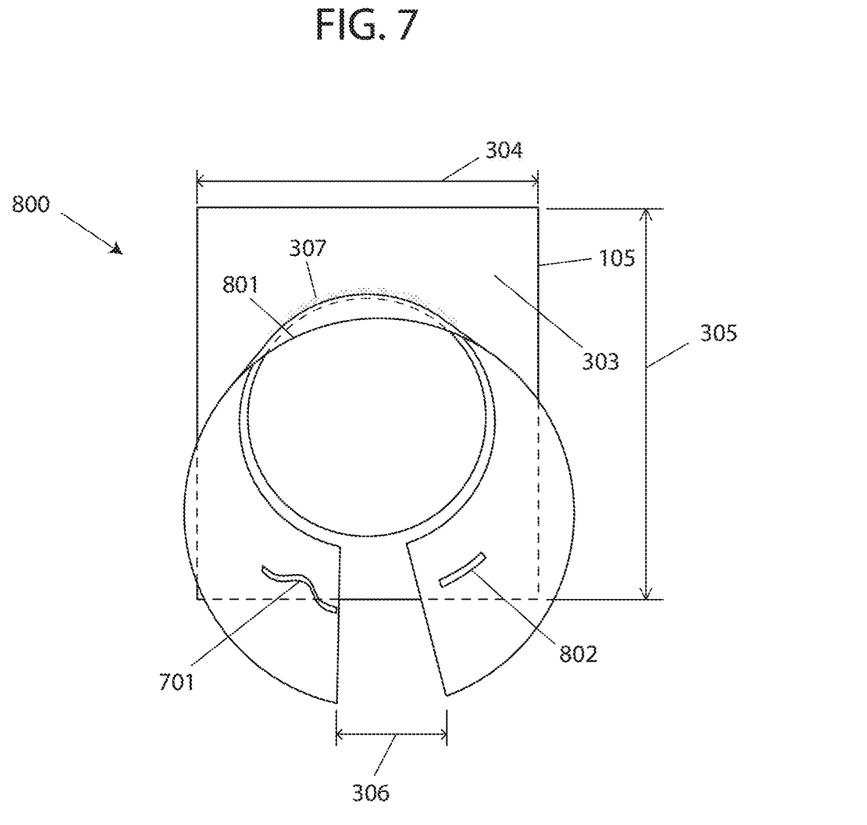
FIG. 7 illustrates a perspective view 800 of an embodiment of the device disclosed herein, depicting the catch basin trap 105 comprising a saddle portion 701 and saddle portion slot 802.

FIG. 6 depicts an embodiment of the device 700 disclosed herein, whereby the jaw-like arms 103 of the device are clasping the catch basin trap 105 with a clasp 111 is engaged with the pin 109 that is engaged with a saddle portion 701 of the catch basin trap 105. Turning to FIG. 7, the perspective view 800 of an embodiment of the disclosure further illustrates the catch basin trap 105 comprising a saddle portion 701 and saddle portion slot 802. The catch basin trap 105 comprises a catch basin trap left edge 703 and a catch basin trap right edge 702. During the installation method, the catch basin trap column 801 is manually expanded to create a gap distance 306 of between about 0.5 inches and 6 inches of the catch basin trap 105. In some embodiments, the gap distance 306 of between about 1 inch and 4 inches of the catch basin trap 105. Then, the catch basin trap column 801 is compressed and the saddle portion 701 is inserted into the saddle portion slot 802, wherein the pin 109 is inserted into the saddle portion 701 as depicted with FIG. 6 to afford the catch basin trap column overlap 704 of between about 0.5 inches and 12 inches. In some embodiments, the catch basin trap column overlap 704 is between about 0.5 inches and 4 inches. In some embodiments, the catch basin trap column 801 is affixed to a backside face 303 of the catch basin trap 105 along the upper seam 307, which allows the remaining circumference of the catch basin trap column 801 to contract as depicted with FIG. 6 with the pin 109 installed in the saddle portion 701. In some embodiments, the front face 110 and the back side 303 have a width 304 of between about 6 inches and 36 inches and a height 305 of between about 6 inches and 36 inches. In some embodiments, the front face 110 and the back side 303 have a width 304 of about 7.5 inches and a height 1102 of about 9.75 inches.

Figure 8:
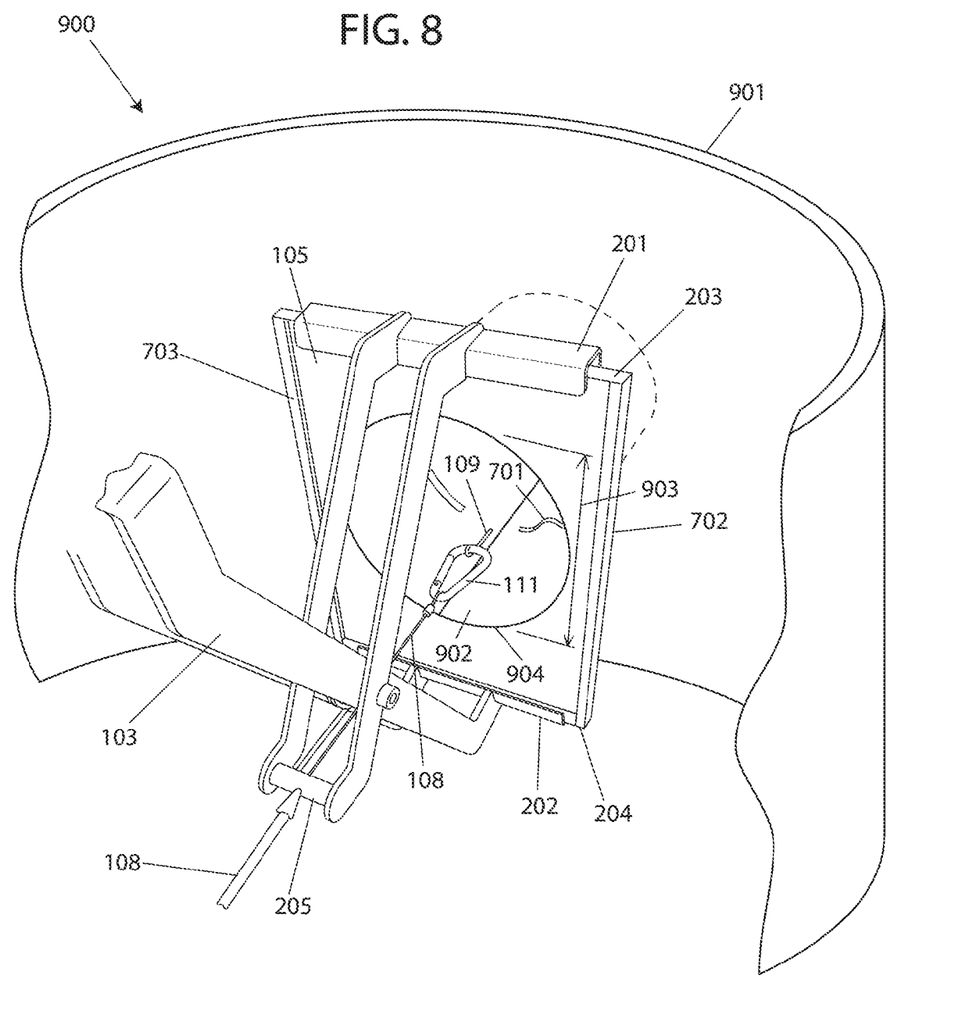
FIG. 8 illustrates a perspective view 900 of an embodiment of the device disclosed herein, wherein the jaw-like arms 103 of the device are clasping a catch basin trap 105 with a clasp 111 is engaged with a pin 109 that is engaged with a saddle portion 701 of the catch basin trap 105, and wherein the catch basin trap is being installed in a catch basin 901.

FIG. 8 illustrates a perspective view 900 of an embodiment of the device disclosed herein, wherein the jaw-like arms 103 of the device are clasping a catch basin trap 105 with a clasp 111 is engaged with a pin 109 that is disengaged with a saddle portion 701 of the catch basin trap 105, and wherein the catch basin trap is being installed in a catch basin pipe 904 of catch basin 901. In some embodiments, a diameter 903 of the catch basin trap column 801 is between about 4 inches and 12 inches. In some embodiments, a diameter 903 of the catch basin trap column 801 is about 4 inches, 6 inches, 8 inches, 10 inches or 12 inches. In some embodiments, the catch basin trap 105 comprises a catch basin trap column 801 with a diameter 903 capable of snap-action installation in a catch basin comprising a pipe diameter 903 of 4 inches, 6 inches, 8 inches, 10 inches and/or 12 inches. As depicted, the catch basin trap column overlap 704 of FIG. 6 is reduced or eliminated to afford a catch basin trap column expanded portion 902, whereby the catch basin trap 105 is held into place in the catch basin of a storm drain with the pressure from the catch basin trap column 801 derived from an installation method, whereby as discussed above the catch basin trap column 801 is manually expanded to create a gap distance 306 of between about 0.5 inches and 6 inches of the catch basin trap 105. Then, the catch basin trap column 801 is compressed and the saddle portion 701 is inserted into the saddle portion slot 802, wherein the pin 109 is inserted into the saddle portion 701 as depicted with FIG. 6 to afford the catch basin trap column overlap 704.

Figure 9:
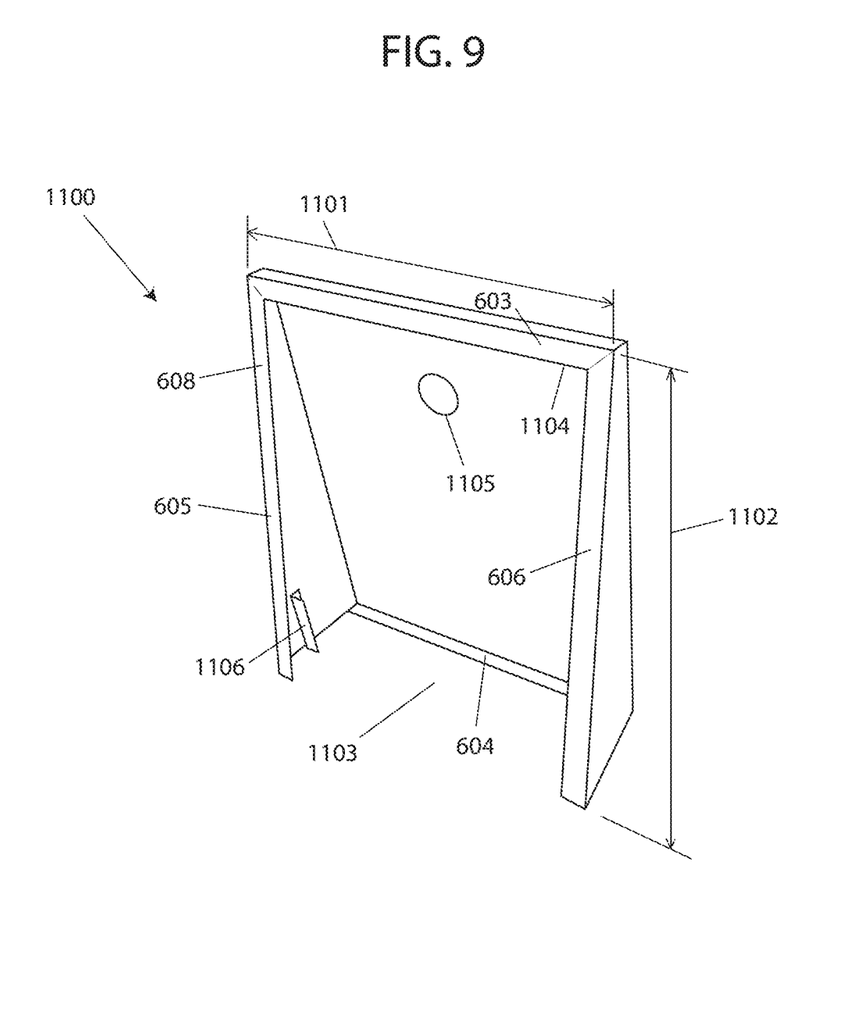
FIG. 9 illustrates a backside 1100 of a hood 608 of the device disclosed herein, wherein the backside 1100 of the hood 608 comprises a hood top side 603, a hood inlet cavity 1103, a hood left edge 606 and a hood right edge 605.

In some embodiments, the kit for installing a catch basin trap further comprises a catch basin trap hood. FIG. 9 illustrates a backside 1100 of a catch basin trap hood 608 of the device disclosed herein, wherein the backside 1100 of the hood 608 comprises a hood top side 603, a hood inlet cavity 1103, a hood left edge 606 and a hood right edge 605. Moreover, the backside 1100 of a catch basin trap hood 608 of FIG. 9 illustrates a hood tab 1106 adjacent to a lower portion of the hood right edge 605, thereby creating a channel between the hood tab 1106 and the hood right edge 605 capable of engaging the catch basin trap right edge 702. In some embodiments, the catch basin trap hood comprises one or more hood tabs. The catch basin hood 608 of FIG. 9, comprises a hood cavity comprising a hood inlet cavity 1103 afforded by perimeter derived from the lower hood edge 604 and the angled sides 602 and 607 of the hood of FIG. 5. In some embodiments, the catch basin trap hood 608 comprises the concave edge formed from an inner left hood edge 606 an inner right hood edge 605 and an inner top hood edge 1104 formed along the left hood side 607, right hood side 602 and the upper hood edge 603, respectively. The catch basin trap left edge 703, catch basin trap right edge 702 and the top catch basin edge 203 are capable of engaging with the inner left hood edge 606 and a first hood tab 1106, inner right hood edge 605 and a second hood tab 1106, and the upper hood edge 603, respectively. During installation of the catch basin trap hood 608 is slidably engaged down encompassing the catch basin trap left edge 703, catch basin trap right edge 702 and the top catch basin edge 203. In some embodiments, the catch basin trap hood 608 has a width 1101 of between about 6 inches and 42 inches and a height 1102 of between about 6 inches and 42 inches. In some embodiments, the catch basin trap hood 608 has a width 1101 of about 7.5 inches and a height 1102 of about 9.75 inches. In some embodiments, the catch basin trap hood 608 comprises a hood removal aperture 1105, which allows an operator to remove the catch basin trap hood 608 via the aperture 1105 with a hooked shaped tool whereby the catch basin trap hood 608 is pulled vertically upward and slidably disengaged from the catch basin trap 105.

Figure 10:
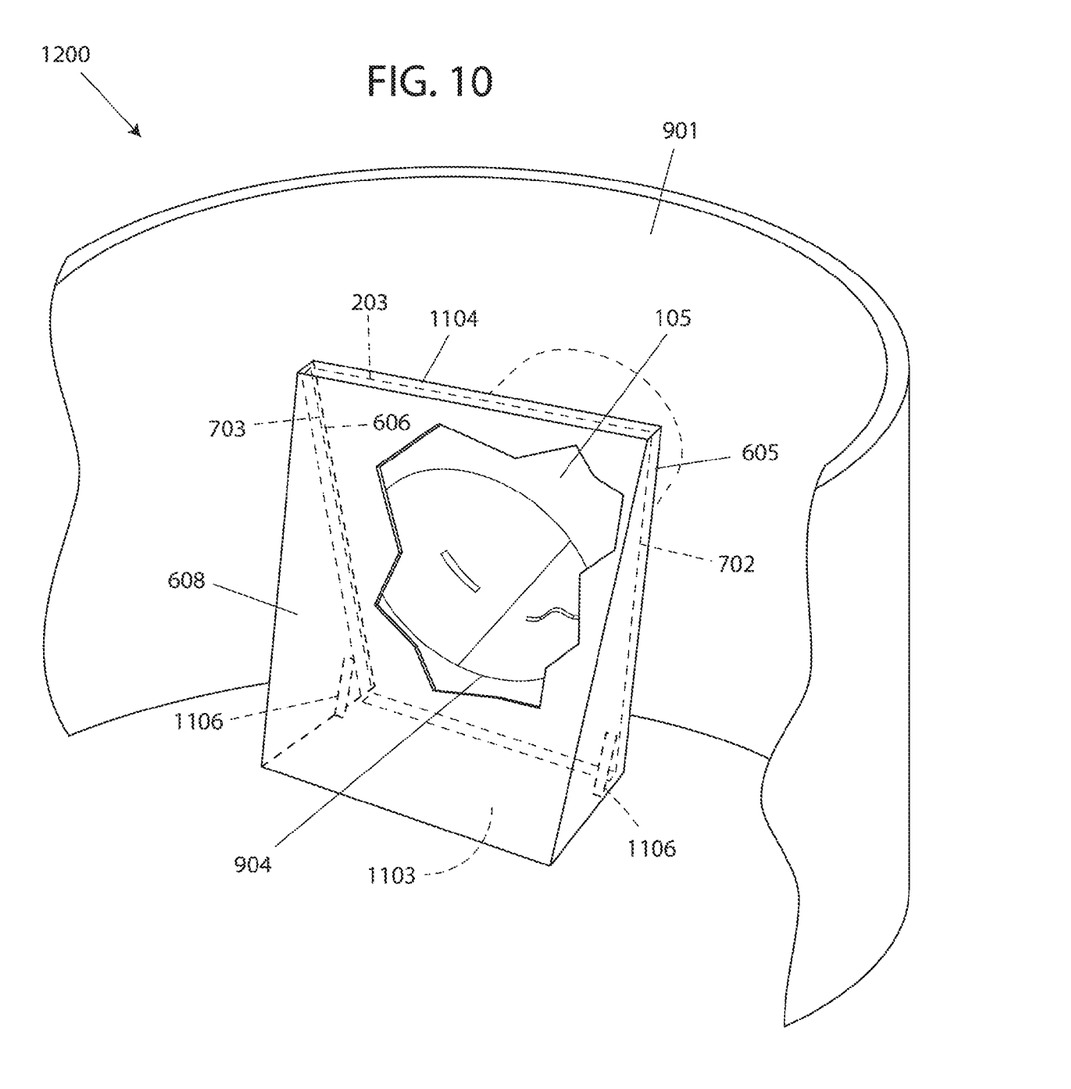
FIG. 10 illustrates a perspective view 1200 of an embodiment of the device, whereby the catch basin trap 105 is installed into a catch basin 901 with the hood 608 installed over the catch basin trap 105.

FIG. 10 illustrates a perspective view 1200 of an embodiment of the device, whereby the catch basin trap 105 is installed in a catch basin 901 with the hood 608 installed over the catch basin trap 105. Removal of the catch basin trap hood 608 is accomplished by engaging with the jaws 103 via the lower jaw slot 202 and a upper jaw slot 201 and the lower hood edge 604 and a upper hood edge 603, whereby the catch basin trap hood 608 is slidably removed in a vertical direction opposite to the catch basin trap hood 608 installation method. The catch basin hood 608 of FIG. 10, comprises a hood cavity comprising a hood inlet cavity 1103 afforded by perimeter derived from the lower hood edge 604, the angled sides 602 and 607 of the hood of FIG. 5, and the front face 110 of a catch basin trap 105. In this aspect, the hood inlet cavity 1103 allows water to flow through the catch basin trap, but reduces or eliminates debris and other solids from entering a catch basin piping system and being discharged into bodies of water such as oceans, bays, rivers, lakes, and streams.

Removal of the catch basin trap 105 is accomplished by engaging the lower jaw slot 202 and the upper jaw slot 201 with a top catch basin edge 203 and a bottom catch basin edge 204, whereby the catch basin trap 105 is slidably removed in a horizontal direction opposite to the catch basin trap 105 installation method.

In another aspect, disclosed herein is a method for installing, maintaining, and/or removing a catch basin hood and/or a catch basin trap; the method comprising: a) providing a device comprising a shank connecting a handle on one end and jaw-like arms on an opposite end, wherein the handle end of the shank further comprises a lever capable of actuating the jaw-like arms for snap-action installation of a catch basin trap; b) engaging the jaw-like arms with a top edge and bottom edge of a front face of the catch basin trap; c) inserting the catch basin trap into a catch basin; and d) activating the lever of the device to activate release of the pin for snap-action installation of the catch basin trap.

In some embodiments, the method for installing, maintaining, and/or removing a catch basin hood and/or a catch basin trap; the method comprises the step of engaging the jaw-like arms with an upper hood edge and a lower hood edge of a front hood side of the catch basin trap hood. In some embodiments, the method for installing, maintaining, or removing a catch basin trap; the method further comprising the step of installing the catch basin trap hood onto the catch basin trap.

In some embodiments, the method for installing, maintaining, and/or removing a catch basin hood and/or a catch basin trap; the method comprises that the lever is connected to a pin via a cable, and wherein the lever is capable of activating release of the pin for the snap-action installation of a catch basin trap by pulling the pin triggering the catch basin trap to expand and/or lock into the catch basin.

In some embodiments, the method for installing, maintaining, and/or removing a catch basin hood and/or a catch basin trap; the method comprises that the shank is hollow. In some embodiments, the method for installing, maintaining, or removing a catch basin trap; the method comprises that the handle end comprises a hand grip. In some embodiments, the method for installing, maintaining, or removing a catch basin trap; the method comprises that the jaw-like arms are capable of swiveling at an angle sufficient for installing the trap in or removing the trap from a corresponding catch basin.

In some embodiments, the method for installing, maintaining, and/or removing a catch basin hood and/or a catch basin trap; the method comprises that the swivel of the jaw-like arms rotates the arms up to a 228° angle.

In yet another aspect, disclosed herein is a kit for installing, maintaining, and/or removing a catch basin hood and/or a catch basin trap; the kit comprising: a) a device comprising a shank connecting a handle on one end and jaw-like arms on an opposite end, wherein the handle end of the shank further comprises a lever capable of actuating a snap-action installation of a catch basin trap; and b) a catch basin trap.

The device disclosed herein is fabricated from the group consisting of galvanized sheet metal, carbon steel, aluminum, stainless steel, plastic, carbon composite or a combination thereof.

The catch basin trap installation device disclosed herein may incorporate any number of design features, dimensions, and/or variations known and/or available to the skilled artisan. For example, the trap installation device of the present disclosure may include, without limitation, any component and/or components, part and/or parts common to and/or related to and/or used in association with a installation, maintenance and/or removal of a trap and/or hood in a corresponding catch basin of and/or a corresponding storm drain.

DEFINITIONS

Catch basin traps are well known as often being employed for alleviating pollutants and/or debris from contaminating the water source at the outlet point. For the purposes of the present disclosure, a "trap" for a catch basin of a storm drain is a term which may be used interchangeably with the terms "system", "trap system", "insert", "pipe", "hood", "hood assembly", "bag", and/or "filter". Generally, a trap is designed to collect and/or catch and/or filter debris and larger particles from flowing into a body of water; thereby contaminating the body of water.

For the purposes of the present disclosure, the terminology "corresponds to" means that there is a spatial and/or functional relationship between two or more objects, components and/or parts which correspond to each other. For example, a catch basin trap or pipe corresponds to and/or functions with and/or fits with (into or out of) a corresponding catch basin of a storm drain.

For the purposes of the present disclosure, certain terms used herein may also be found in other fields as apparent to a person skilled in the art. For this reason, such terms used herein should not be taken as to limit the scope of the present disclosure and includes all other types of objects or related fields with which the present disclosure may be used and may be useful.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or devices, which can of course vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict any definitions in this disclosure.

What is claimed is:

1. A device for installation, maintenance, and/or removal of a catch basin hood and/or a catch basin trap; the device comprising a shank connecting a handle on one end and jaw-like arms on an opposite end, wherein the handle end of the shank further comprises a lever capable of actuating a snap-action installation of a catch basin trap, wherein the lever is connected to a pin via a cable, and wherein the lever is capable of activating release of the pin for the snap-action installation of a catch basin trap by pulling the pin triggering the catch basin trap to expand and/or lock into the catch basin.

2. The device of claim 1, wherein the shank is hollow.

3. The device of claim 1, wherein the handle end comprises a hand grip.

4. The device of claim 1, wherein the jaw-like arms are capable of swiveling at an angle sufficient for installing the trap in or removing the trap from a corresponding catch basin.

5. The device of claim 4, wherein the swivel of the jaw-like arms rotates the arms up to a 228° angle.

6. A method for installing, maintaining, and/or removing a catch basin hood and/or a catch basin trap; the method comprising:
   a) providing a device comprising a shank connecting a handle on one end and jaw-like arms on an opposite end, wherein the handle end of the shank further comprises a lever capable of actuating the jaw-like arms for snap-action installation of a catch basin trap, wherein the lever is connected to a pin via a cable, and wherein the lever is capable of activating release of the pin for the snap-action installation of a catch basin trap by pulling the pin triggering the catch basin trap to expand and/or lock into the catch basin;
   b) engaging the jaw-like arms with a top edge and bottom edge of a front face of the catch basin trap;
   c) inserting the catch basin trap into a catch basin; and
   d) activating the lever of the device to activate release of the pin for snap-action installation of the catch basin trap.

7. The method of claim 6, further comprising the step of engaging the jaw-like arms with an upper hood edge and a lower hood edge of a front hood side of the catch basin trap hood.

8. The method of claim 7, further comprising the step of installing the catch basin trap hood onto the catch basin trap.

9. The method of claim 6, wherein the lever is connected to a pin via a cable, and wherein the lever is capable of activating release of the pin for the snap-action installation of a catch basin trap by pulling the pin triggering the catch basin trap to expand and/or lock into the catch basin.

10. The method of claim 6, wherein the shank is hollow.

11. The method of claim 6, wherein the handle end comprises a hand grip.

12. The method of claim 6, wherein the jaw-like arms are capable of swiveling at an angle sufficient for installing the trap in or removing the trap from a corresponding catch basin.

13. The method of claim 12, wherein the swivel of the jaw-like arms rotates the arms up to a 228° angle.

14. A kit for installing, maintaining, and/or removing a catch basin hood and/or a catch basin trap; the kit comprising:
   a) a device comprising a shank connecting a handle on one end and jaw-like arms on an opposite end, wherein the handle end of the shank further comprises a lever capable of actuating a snap-action installation of a catch basin trap, wherein the lever is connected to a pin via a cable, and wherein the lever is capable of activating release of the pin for the snap-action installation of a catch basin trap by pulling the pin triggering the catch basin trap to expand and/or lock into the catch basin; and
   b) a catch basin trap.

15. The kit of claim 14, further comprising a catch basin trap hood.

16. The kit of claim 14, wherein the catch basin trap further comprises a pin.

* * * * *